Patented Aug. 15, 1950

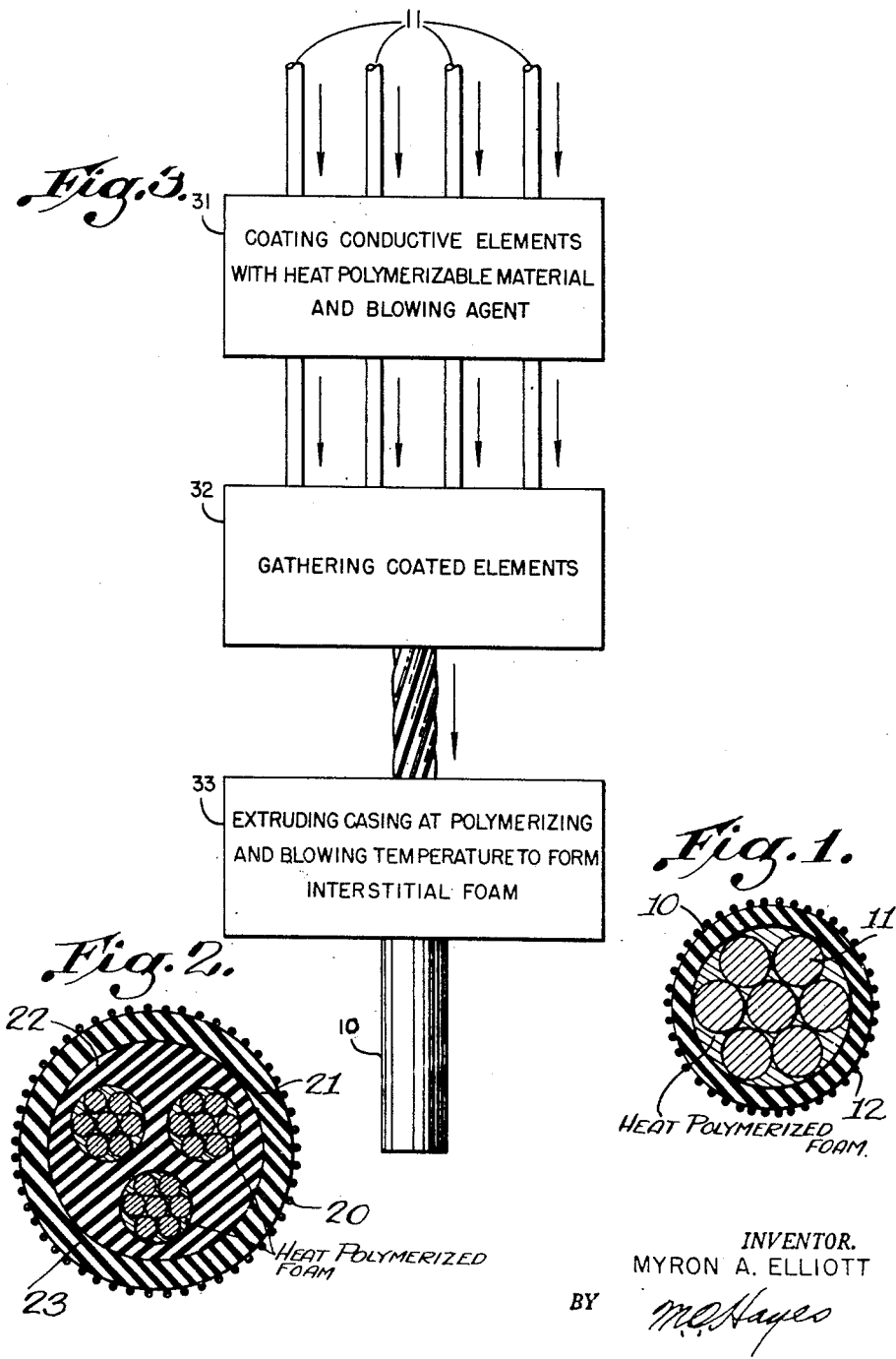

2,518,454

UNITED STATES PATENT OFFICE 2,518,454

MANUFACTURE OF WATER SEALED CABLE AND CONSTRUCTION THEREOF

Myron A. Elliott, Washington, D. C.

Application November 14, 1944, Serial No. 563,419

3 Claims. (Cl. 174—114)

(Granted under the act of March 3, 1883, as amended April 30, 1928; 370 O. G. 757)

My invention relates to the construction of multi-stranded cable which is sealed against the passage of water lengthwise therethrough and to the method of fabricating such cable.

Recent uses of heavy cables on board ship and in other places where the cable is or might be exposed to water have pointed up a serious weakness in multi-stranded cable as it is now constructed. Common constructions employ seven, nineteen, or more strands per conductor but any number can be used. The completed cable may be either single or multiconductor. Although the mechanical construction is rugged and looks compact the free volume, for example, in a conductor made up of seven strands is over twenty per cent of the total circumscribed volume. A cable comprising three seven-strand conductors thus has the equivalent of a relatively large diameter open tube running its entire length and having a cross section about sixty per cent of the cross section of one of the conductors. Ordinarily the large free volume in a cable has no effect on its electrical or load carrying characteristics.

In warships great effort is made to insure the watertight integrity of compartments and to have cable with a large free volume passing from one compartment to another involves the risk of flooding a dry compartment in case a cable connects it to a flooded one. Another serious risk likely to occur in almost any common power installation is that of damaging electrical machinery at the dry end of a cable should one end be exposed to a head of water.

It is the primary object of my invention to provide a multi-stranded cable which is sealed against the lengthwise passage of water along any of its conductors.

It is a secondary object of my invention to provide sealed cable without adversely affecting its electrical load carrying ability.

Other objects and advantages of my invention will in part be obvious and in part appear hereinafter.

My invention comprises the cable possessing the features, properties and relation of elements, which are exemplified in the following detailed disclosure and the scope of the invention will be indicated in the claims.

The construction of my cable and the method of fabricating it can be more readily understood by reference to the following detailed description thereof and the accompanying drawings in which:

Figure 1 is a drawing representing a cross-sectional view of a seven-strand single-conductor cable;

Figure 2 is a drawing representing a cross-sectional view of a seven-strand three-conductor cable.

Figure 3 is a drawing showing a preferred method of making the cable.

In the figures I have shown cables with seven-strand conductors for simplicity and clarity. Actually, large cables contain many more than seven strands in a single conductor.

Referring to Figure 1, 10 represents the outer insulating jacket, 11 represents a wire, seven of which comprise the conductor, and 12 the outer armor. It can be easily shown that the interstitial area in the cross section of a cable like that shown in the drawing is $2/9$ of the total cross-sectional area circumscribing a single seven-strand conductor.

In Figure 2 there is illustrated a three conductor cable in which 20 represents the armored casing, 21 and 22 insulating material enclosing the conductors and 23 the wires making up the conductors of which, in this case, there are twenty-one. In this particular instance, the total interstitial area is $6/9$ or practically 70% of the cross-sectional area of a single conductor.

It is apparent from the above consideration of the geometry of stranded cables that every cable, in addition to conductors, has the equivalent of a substantial open tube running its length. By means of some simple tests I have found that by applying water under a head of thirty feet to one end of a five-foot length of medium size Navy cable containing a single conductor of seventy-three strands of number 10 wire (total diameter was $\tfrac{7}{16}$ inch) water flowed through it at the rate of sixteen gallons per hour.

The geometry of cables comprising insulated and armored bundles of wire, for example, the telephone type of cable, is exactly analogous to that of the stranded cable outlined above. The interstitial free volume in a cable comprising a bundle of separately covered wires or conductors is a substantial fraction of the total volume of the cable.

In the past a great many different cable constructions have been devised in which powdered mineral materials such as glass, mica, sand, calcium oxide, magnesium oxide and asbestos have been used as the primary insulating material. By primary insulating material I mean that material which separates, insulates and holds in spatial relationship the several conductors of a cable. For example, it is well known in the cable art to construct coaxial cable in which the dielectric is calcium oxide, magnesium oxide or a mixture of the two. My invention is not concerned with the provision of primary insulating materials for cables. My invention is concerned with methods of making common cable constructions resistant to the flow of water therethrough by means of a modification of their construction and method of their assembly.

I have discovered a method of filling the interstitial volume of cable conductors with a foraminous dielectric material and that by so doing I can increase the water impedance of the cable to such an extent that water cannot penetrate lengthwise into the cable to any significant extent even when it is under substantial pressure.

A considerable variety of dielectric compositions can be used but, generally, I prefer any heat polymerizable material which is flexible after polymerization such as polyvinyl chloride, polyvinyl acetate, butadiene-styrene polymeric compositions, butadiene-acrylonitrile polymeric compositions, polybutenes, polyisobutylenes, ethylene chloride-sodium polysulfide resins as exemplified generally by the Thiokol resins, soft coal-tar resins such as polystyrenes and polycoumarones, polychloroprenes, acrylonitriles, polybutadienes, vinylidene chloridevinyl chloride copolymers and, generally, any of that class of materials commonly referred to today as synthetic rubbers, synthetic rubber substitutes and elastomers. Of course, natural rubber, if available, can be used although its heat resisting properties are limited.

Recently there has become available a new class of polymeric insulating materials, namely, the organo-silicon polymeric varnishes and resins. These materials make excellent insulators in all electrical installations and because of their partial inorganic nature, are especially good for high temperature work. They, like the more or less conventional strictly organic polymers, can also be made heat polymerizable and can be applied to the process of cable manufacture in the same manner as the purely organic polymers more specifically discussed in this specification.

The foraminous structure or foam is created in quite conventional fashion by, first, adsorbing a quantity of carbon dioxide or other inert gas on finely divided activated charcoal, making a suspension of the charcoal in the partially polymerized material and then causing the gas to be released and the material to be further polymerized by heating, thus generating foam.

Other foam generating materials can be used, for example, sodium nitrite plus ammonium chloride, ammonium carbonate, diazoamino benzene, oleic acid and zinc, sodium bicarbonate, and other blowing agents commonly used in the rubber industry to make sponge rubber.

In carrying out my invention, it is preferable to have the polymerizable material partially polymerized and in liquid or paste form. Generally the polymers mentioned above are available commercially as liquids or pastes partially polymerized to a given molecular weight. Typical of such products are "Plastisol" XE-777 (polyvinyl chloride base material) manufactured by Carbide and Carbon Corporation and Lp-2 (a thio rubber) manufactured by the Thiokol corporation.

For the foam generating ingredient I use, for example, a very finely divided activated charcoal, such as activated coconut char which has been ground to 100 mesh or finer size, then heated two hours at 150° C. to drive off adsorbed water. Carbon dioxide is then adsorbed on the surface by shaking the char with Dry Ice for about 5 minutes. The adsorption is a simple, well-known laboratory procedure and the method of carrying it out need not be described in greater detail. Based upon the porosity of the foam I desire to create in the interstices of the cable conductor, I add a given quantity of the charcoal to the polymer liquid or paste. The wires 11 which are to form the conductor are passed through or dipped in the charcoal suspension to coat them with a thin film of the mix at station 31 of Fig. 3, they are grouped at station 32 and the insulation 10 extruded around them in conventional fashion at station 33. The heat required to keep the insulation sufficiently plastic to make it extrudable is generally ample to heat the polymer film on the strands to cause the polymerization desired and to cause the charcoal to release its adsorbed gas. Thus in a single operation, the conductor is enclosed in an extruded insulating jacket and heated sufficiently to generate the foam in the interstices of the conductor. It is preferable to use as a foam a polymeric material of the same nature as that used as the primary insulation for the cable.

Several cables were made up in which the interstices among the conductors were filled with plastic foam. Under test, all of them withstood thirty foot heads of water for forty-eight hours with no significant amount of water penetration into the cable.

The method of carrying out my invention will be more clearly understood from the following examples in which the preparation of several cables is described in detail:

EXAMPLE I

A foam generating suspension was made up as follows: 100 grams of "Plastisol" XE-777 was mixed with 5 grams of finely divided activated charcoal which had been exposed previously to carbon dioxide at −60° C. for five minutes. The mixing was done while maintaining temperatures low enough to avoid appreciable desorption of the gas.

Nineteen strands of number 16 copper wire were passed through the charcoal-"Plastisol" suspension to deposit thereon a film of the suspension (approximately 0.004 inch). The coated wires were grouped and a polyvinyl chloride insulating jacket extruded around them. The heat necessary to keep the primary insulating polyvinyl chloride hot enough to flow was sufficient to finish the polymerization of the "Plastisol" film on the wires and to cause the desorption of the gas.

The cable thus made was tested for its water impedance by applying water under a thirty foot heat to one end for forty-eight hours. Subsequent dissection of the cable revealed the foam was quite uniform throughout and that water had penetrated two inches.

EXAMPLE II

A foam generating suspension was made up as follows: 100 grams of Lp-2 was mixed with 10 grams of zinc oxide catalyst and 5 grams of finely divided activated charcoal. The charcoal had been exposed previously to carbon dioxide at −60° C. for 5 minutes. The mixing was done while maintaining temperatures low enough to avoid desorption of the gas.

Nineteen strands of number 16 copper wire were passed through the charcoal-Lp-2 suspension to deposit thereon a thin film of the suspension (0.004 inch). The coated wires were grouped and an insulating jacket extruded around them at once. The heat necessary to keep the insulating jacket hot enough to flow was sufficient to finish the polymerization of the Lp-2 on the wires and to cause the desorption of the gas.

The cable thus made was tested for its water impedance by applying water under a thirty foot head to one end for forty-eight hours. Subsequent dissection of the cable revealed the foam was quite uniform throughout and that water had penetrated only about 2 inches.

EXAMPLE III

A foam generating suspension was made up as follows: 100 grams of "Plastisol" XE-777 was mixed with 5 grams of diazoamino benzene to give a heat reactive sealing compound.

Nineteen strands of number 16 copper wire were passed through the "Plastisol" suspension to deposit thereon a thin film (approximately 0.004 inch). The coated wires were grouped, preheated, and a polyvinylchloride insulating jacket extruded around them. The heat necessary to keep the jacketing material hot enough to flow was sufficient to finish the polymerization of the compound on the wires and to cause the evolution of nitrogen to make a foam.

The cable thus made was tested for its water impedance by applying water under a thirty-foot head to one end for forty-eight hours. Subsequent dissection of the cable revealed the foam was uniform throughout and that water had penetrated only about two inches.

Similar tests summarizing results using other blowing agents are outlined in the following table.

Table I

| Foam Forming Polymer | Puffing Agent | Depth Water Penetration in 48 hours (inches) |
|---|---|---|
| Plastisol | Oleic acid plus zinc | 4 |
| Do | Ammonium carbonate | 1 |
| Do | Ammonium nitrite and ammonium chloride | 3 |

Cable constructions are known in which the interstitial volume of the cable is filled with solid plastic material. Naturally such structures do not permit the longitudinal flow of water. My cable with its foraminous interior structure retains substantially all the flexibility of the cable structure having a completely free interstitial volume yet imparts to the cable ability to resist longitudinal flow of water substantially equal to that of cable having its interstitial volume filled with solid plastic material.

From the foregoing description, examples and data, the embodiments of my invention will be clear, but it is to be understood that the invention is not restricted to the present disclosure to any extent otherwise than it is restricted by the manner in which such invention is claimed. It is also intended that the following claims cover all of the generic and specific features of the invention herein described, and all the statements of the scope of the invention, which as a matter of language might be said to fall therebetween.

The invention described herein may be manufactured and used by or for the Government of the United States of America for governmental purposes without the payment of any royalties thereon or therefor.

Having described my invention what I claim as new and desire to secure by Letters Patent of the United States is:

1. In the fabrication of a cable having an insulating casing enclosing a plurality of cylindrical elements arranged to establish interstices in said cable, the method of producing said cable sealed against longitudinal passage of water in said cable through said interstices which comprises coating each of said elements with a heat-polymerizable material including a blowing agent suspended therein, gathering said elements in a manner to form said interstices, and extruding said casing over said gathered elements at a temperature high enough to polymerize said heat-polymerizable material and to cause said blowing agent to liberate gas thereby creating a polymeric foam in said interstices.

2. In the fabrication of an electrical cable having an insulating casing enclosing a plurality of strands arranged to establish interstices in said cable, the method of producing the cable sealed against longitudinal passage of water in said cable through said interstices which comprises coating each of said strands with a heat-polymerizable material including a blowing agent suspended therein, gathering said strands in a manner to form said interstices, and extruding said casing over said gathered strands at a temperature high enough to polymerize said heat-polymerizable material and to liberate gas from said blowing agent thereby creating a polymeric foam in said interstices.

3. A water sealed electric cable comprising a composite conductor having bare cylindrical conductive elements adjacently aligned and forming interstices longitudinally of the wire, polymeric foam of substantially uniform porosity filling the interstices, and an insulating jacket tightly enclosing the conductor.

MYRON A. ELLIOTT.

REFERENCES CITED

The following references are of record in the file of this patent:

UNITED STATES PATENTS

| Number | Name | Date |
|---|---|---|
| 1,385,044 | Fulton | July 19, 1921 |
| 1,536,288 | Freedlander et al. | May 5, 1925 |
| 1,931,333 | Taylor | Oct. 17, 1933 |
| 1,940,917 | Okazaki | Dec. 26, 1933 |
| 1,952,191 | Arutunoff | Mar. 27, 1934 |
| 1,977,325 | Pfannkuch | Oct. 16, 1934 |
| 2,029,421 | Green et al. | Feb. 4, 1936 |
| 2,186,793 | Wodtke | Jan. 9, 1940 |
| 2,199,006 | Minor | Apr. 30, 1940 |
| 2,289,732 | Rosch | July 14, 1942 |
| 2,298,324 | Williams | Oct. 13, 1942 |
| 2,371,868 | Berg et al. | Mar. 20, 1945 |
| 2,386,995 | Wigal | Oct. 16, 1945 |
| 2,393,466 | Greenfield | Jan. 22, 1946 |